United States Patent
Whitehurst

(10) Patent No.: US 9,840,922 B2
(45) Date of Patent: Dec. 12, 2017

(54) FAN BLADE SPACER

(71) Applicant: UNITED TECHNOLOGIES CORPORATION, Farmington, CT (US)

(72) Inventor: Sean A. Whitehurst, South Windsor, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 280 days.

(21) Appl. No.: 14/546,471

(22) Filed: Nov. 18, 2014

(65) Prior Publication Data

US 2015/0252678 A1 Sep. 10, 2015

Related U.S. Application Data

(60) Provisional application No. 61/949,649, filed on Mar. 7, 2014.

(51) Int. Cl.
*F01D 5/32* (2006.01)
*F01D 5/30* (2006.01)
*F01D 5/02* (2006.01)

(52) U.S. Cl.
CPC .............. *F01D 5/326* (2013.01); *F01D 5/02* (2013.01); *F01D 5/3092* (2013.01); *F01D 5/323* (2013.01); *F05D 2220/32* (2013.01); *F05D 2220/36* (2013.01); *F05D 2230/70* (2013.01); *F05D 2230/72* (2013.01); *F05D 2230/80* (2013.01); *F05D 2240/30* (2013.01); *F05D 2250/281* (2013.01); *F05D 2300/501* (2013.01); *Y02T 50/672* (2013.01)

(58) Field of Classification Search
CPC ..... F01D 5/02; F01D 5/22; F01D 5/30; F01D 5/3007; F01D 5/3023; F01D 5/3092; F01D 5/323; F01D 5/326; F01D 5/00; F01D 5/10; F01D 5/12; F01D 5/16; F01D 5/26; F05D 2220/32; F05D 2220/36; F05D 2230/70; F05D 2230/72; F05D 2230/80; F05D 2240/30; F05D 2250/281; F05D 2300/501
See application file for complete search history.

(56) References Cited

U.S. PATENT DOCUMENTS

| | | | |
|---|---|---|---|
| 3,395,891 A * | 8/1968 | Burge | F01D 5/323 416/196 R |
| 3,572,970 A | 3/1971 | Smuland | |
| 5,123,813 A | 6/1992 | Przytulski et al. | |
| 5,350,279 A * | 9/1994 | Prentice | F01D 5/323 416/220 R |
| 6,457,942 B1 | 10/2002 | Forrester | |

(Continued)

FOREIGN PATENT DOCUMENTS

| | | |
|---|---|---|
| EP | 1 357 254 A2 | 10/2003 |
| WO | 2014105104 A1 | 7/2014 |
| WO | 2014113009 A1 | 7/2014 |

OTHER PUBLICATIONS

European Search Report for Application No. 14 19 6351 dated Jul. 16, 2015.

*Primary Examiner* — Arun Goyal
(74) *Attorney, Agent, or Firm* — Cantor Colburn LLP

(57) ABSTRACT

The present disclosure relates generally to a fan blade spacer including a conduit disposed within a fan blade spacer composed of an elastically deformable material.

15 Claims, 3 Drawing Sheets

(56) References Cited

U.S. PATENT DOCUMENTS

| | | |
|---|---|---|
| 8,529,209 B2 | 9/2013 | Belmonte et al. |
| 8,616,850 B2 | 12/2013 | Ward et al. |
| 8,821,127 B1 * | 9/2014 | Knecht .................. F01D 5/323 |
| | | 416/220 R |
| 2009/0004017 A1 | 1/2009 | Belmonte et al. |
| 2013/0156591 A1 | 6/2013 | Alexander |

* cited by examiner

FAN BLADE SPACER

CROSS REFERENCE TO RELATED APPLICATIONS

The present application is related to, and claims the priority benefit of, U.S. Provisional Patent Application Ser. No. 61/949,649 filed Mar. 7, 2014, the contents of which are hereby incorporated in their entirety into the present disclosure.

TECHNICAL FIELD OF THE DISCLOSED EMBODIMENTS

The present invention relates generally to gas turbine engines and, in particular, to a fan assembly that includes one or more fan blade spacers.

BACKGROUND OF THE DISCLOSED EMBODIMENTS

A fan assembly for a typical gas turbine engine includes a plurality of fan blades arranged circumferentially around a rotor disk. Each fan blade may include an airfoil connected to a dovetail root, which is inserted into a respective dovetail slot within the rotor disk. The radial height of the root is typically less than the radial height of the slot. A gap therefore may be formed between a radial inner surface of the root and a radial inner surface of the slot. Such a gap is typically filled with a fan blade spacer.

A typical fan blade spacer reduces slippage and wear between the root and the slot during engine operation when, for example, centrifugal loading on the fan blade is relatively low (e.g., during wind milling). The fan blade spacer may be configured therefore to reduce (e.g., minimize) clearance within the gap that would otherwise be available for relative motion (e.g., pivoting) between the root and the slot. Generally, fan blade spacers are composed of heavy metals or non-durable plastic. The existing non-durable plastic spacers are usually machined to include a retrieval feature that can break during use; thus, requiring a new spacer to be installed.

Improvements in fan blade spacers are therefore needed in the art.

SUMMARY OF THE DISCLOSED EMBODIMENTS

In one aspect, a fan blade spacer is provided. Each spacer includes elongated body member including a first spacer end and a second spacer end. Each spacer may be constructed from an elastically deformable material. In at least one embodiment, the elastically deformable material is selected from a group consisting of: a rigid elastic material, a compliant material, an elastomeric material, a viscoelastic composite material, a plastically crushable material, a thermoplastic material, a thermoset material, and a honeycomb structured material.

Each spacer further includes a conduit, including a conduit outer surface and a conduit inner surface, disposed within the elongated body member. In at least one embodiment, the conduit is positioned near one of either the first spacer end or the second spacer end. In at least one embodiment, the conduit is composed of a metallic material. In at least one embodiment, the conduit includes a plurality of threads disposed on the conduit outer surface. In at least one embodiment, the conduit includes a plurality of threads disposed on the conduit inner surface. In at least one embodiment, the conduit is formed in a helical shape.

Other embodiments are also disclosed.

BRIEF DESCRIPTION OF THE DRAWINGS

The embodiments and other features, advantages and disclosures contained herein, and the manner of attaining them, will become apparent and the present disclosure will be better understood by reference to the following description of various exemplary embodiments of the present disclosure taken in conjunction with the accompanying drawings, wherein.

DETAILED DESCRIPTION OF THE DISCLOSED EMBODIMENTS

Figure 1:
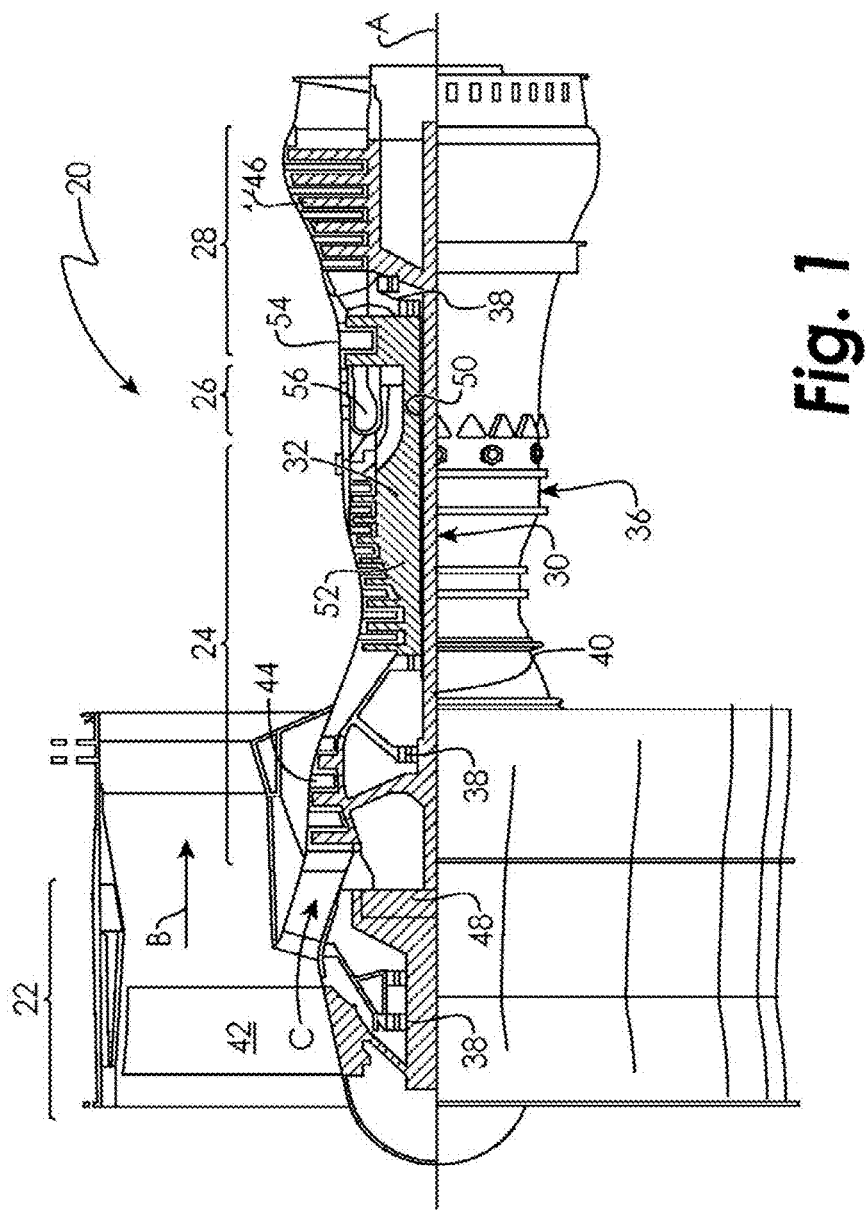
FIG. 1 is a schematic cross-sectional view of a gas turbine engine.

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft., with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(\text{Tram } ° \text{ R})/(518.7° \text{ R})]^{0.5}$. The "Low corrected fan tip speed" as disclosed herein according to one non-limiting embodiment is less than about 1150 ft/second (350.5 m/sec).

Figure 2:
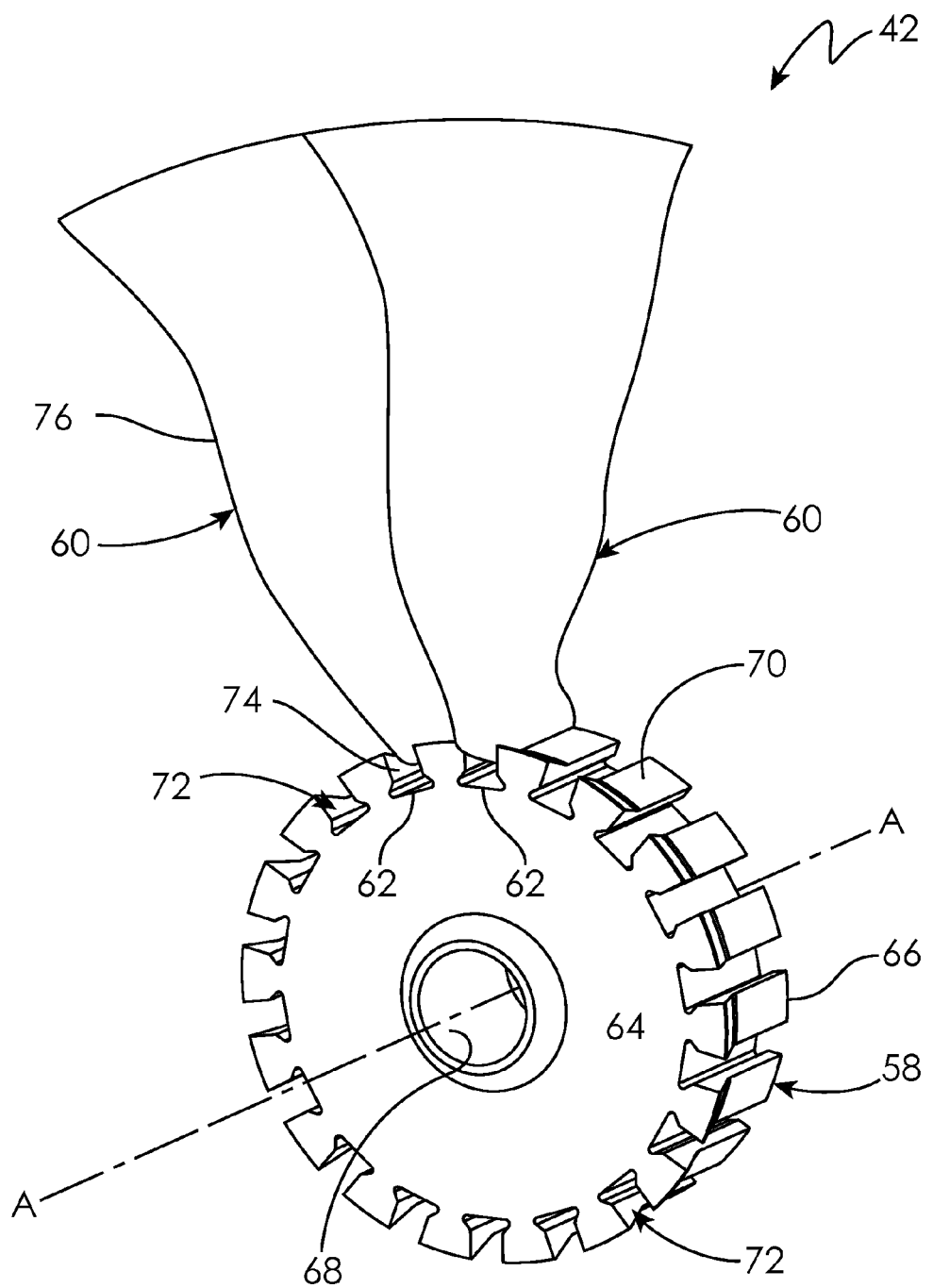
FIG. 2 is a perspective illustration of a partially assembled fan assembly for a gas turbine engine.

FIG. 2 illustrates a partially assembled fan assembly 42 for the gas turbine engine 20. The fan assembly 42 includes a rotor disk 58, a plurality of fan blades 60, and a plurality of fan blade spacers 62. The rotor disk 58 extends along the axial centerline A between a first disk end 64 and a second disk end 66. The rotor disk 58 also extends radially from an inner disk surface 68 to an outer disk surface 70. The rotor disk 58 includes a plurality of slots 72 (e.g., dovetail slots, to name just one non-limiting example) arranged circumferentially around the axial centerline A. Each fan blade 60 includes a root 74 and an airfoil 76.

Figure 3:
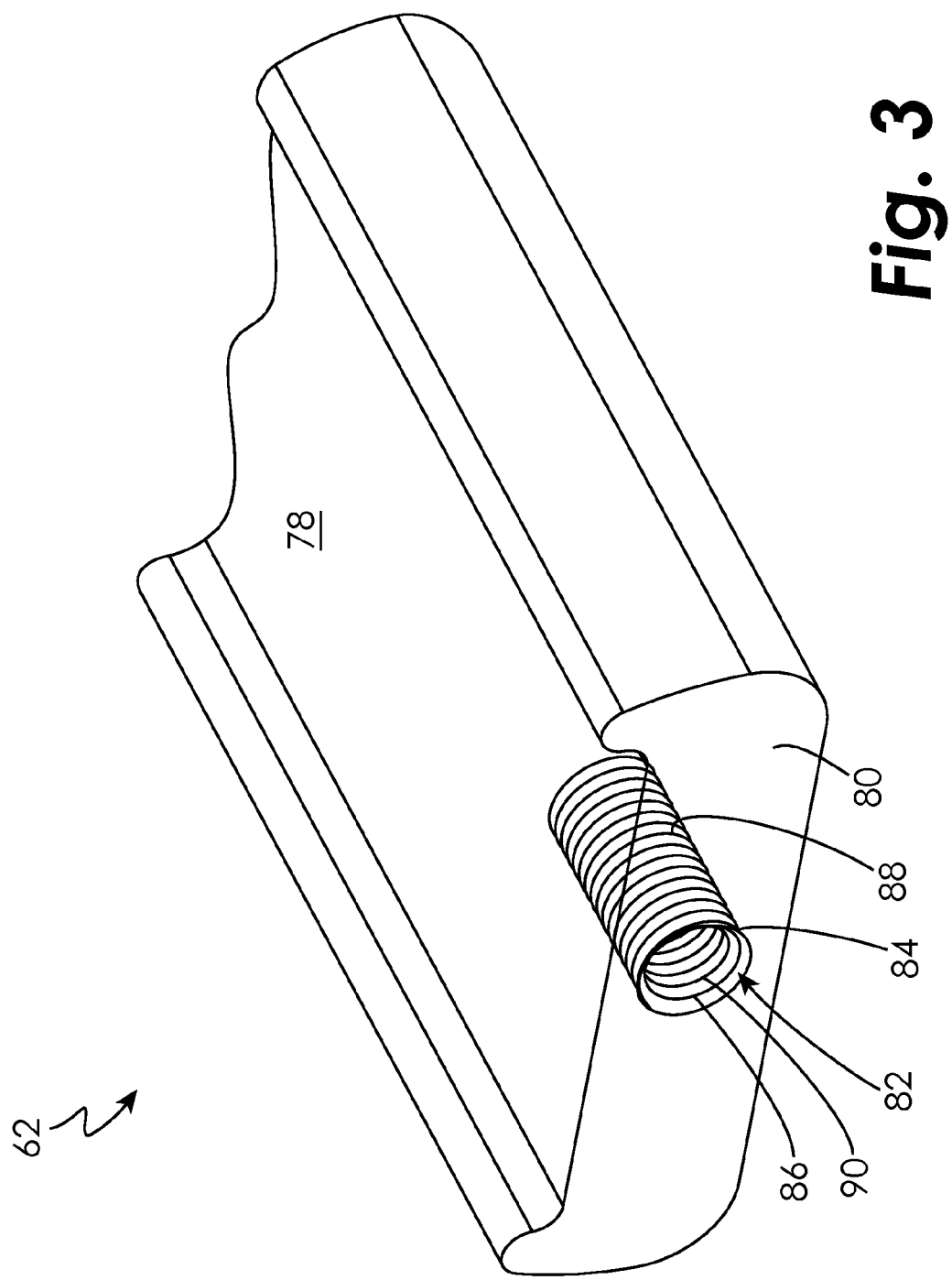
FIG. 3 is a perspective illustration of a spacer for use with a fan assembly.

Referring to FIG. 3, each spacer 62 includes elongated body member 78 including a first spacer end 80 and a second spacer end (not shown). Each spacer 62 may be constructed from an elastically deformable material. In at least one embodiment, the elastically deformable material is selected from a group consisting of: a rigid elastic material, a compliant material, an elastomeric material, a viscoelastic composite material, a plastically crushable material, a thermoplastic material, a thermoset material, and a honeycomb structured material. For example, a rigid elastic material such as a carbon composite material (e.g., laminated, 3D woven carbon sheets, to name just one non-limiting example), a compliant material such as an elastomeric material (e.g., natural or synthetic rubber, to name just two non-limiting examples), a viscoelastic composite material (e.g., a para-aramid synthetic fiber (such as Kevlar®) material and epoxy, to name just one non-limiting example), a plastically crushable material such as a composite crushable core material (to name just one non-limiting example), a thermoplastic material (e.g., polyether ether ketone (PEEK), to name just one non-limiting embodiment), a thermoset material (e.g., vinyl ester bulk molding compound, to name just one non-limiting embodiment), and/or a honeycomb structured material, etc. may be used to construct each spacer 62.

Each spacer 62 further includes a conduit 82, including a conduit outer surface 84 and a conduit inner surface 86, disposed within the elongated body member 78. In at least one embodiment, the conduit 82 is positioned near one of either the first spacer end 80 or the second spacer end (not shown). It will be appreciated that a conduit 82 may be positioned at both the first spacer end 80 and the second spacer end (not shown) to allow access to the conduit 82 from either end. The conduit 82 is configured to cooperate with a suitable tool (not shown) for the safe removal of a spacer 62 in the disassembly of the fan blade 60 from the slot 72 (see FIG. 2). In at least one embodiment, the conduit 82 is composed of a metallic material. For example, the conduit may be composed of aluminum, steel, or titanium to name a few non-limiting examples. In at least one embodiment, the conduit 82 includes a plurality of threads 88 disposed on the conduit outer surface 84. The plurality of threads 88 disposed on the conduit outer surface 84 are configured to reduce the axial movement of the conduit 82 disposed within the elongated body member 78. In at least one embodiment, the conduit 82 includes a plurality of threads 90 disposed on the conduit inner surface 86. The plurality of threads 90 disposed on the conduit inner surface 86 increases the engagement of the suitable tool used to remove the spacer 62. In at least one embodiment, the conduit is formed in a helical shape.

It will be appreciated that each spacer 62 may include a conduit 82 disposed within the elongated body member 78, thus reducing the likelihood of breaking the spacer 62 during removal of the spacer 62 in the disassembly of the fan blade 60 from the slot 72.

While the invention has been illustrated and described in detail in the drawings and foregoing description, the same is to be considered as illustrative and not restrictive in character, it being understood that only certain embodiments have been shown and described and that all changes and modifications that come within the spirit of the invention are desired to be protected.

What is claimed is:

1. A spacer for insertion in a slot in a fan rotor, the spacer comprising:
   an elongated body member including a first spacer end and a second spacer end;
   a conduit, including a conduit outer surface and a conduit inner surface, disposed within the elongated body member, wherein the conduit includes a plurality of threads disposed on the conduit inner surface, wherein the conduit includes a plurality of threads disposed on the conduit outer surface; and
   wherein the elongated body member is composed of an elastically deformable material.

2. The spacer of claim 1, wherein the conduit is positioned near one of either the first spacer end or the second spacer end.

3. The spacer of claim 1, wherein the conduit is composed of a metallic material.

4. The spacer of claim 1, wherein the conduit is formed in a helical shape.

5. The spacer of claim 1, wherein the elastically deformable material is selected from a group consisting of: a rigid elastic material, a compliant material, an elastomeric material, a viscoelastic composite material, a plastically crushable material, a thermoplastic material, a thermoset material, and a honeycomb structured material.

6. A fan rotor comprising:
   a disk including a plurality of slots in its periphery, each slot including a slot bottom surface;
   a plurality of blades attached to the disk, each blade including a blade root engaged in a corresponding one of the plurality of slots;
   an elongated spacer interposed between each of the blade root and the slot bottom surface of the corresponding one of the plurality of slots, wherein the elongated spacer includes a first spacer end and a second spacer end;
   a conduit, including a conduit outer surface and a conduit inner surface, disposed within the elongated spacer, wherein the conduit includes a plurality of threads disposed on the conduit inner surface, wherein the conduit includes a plurality of threads disposed on the conduit outer surface; and
   wherein the elongated spacer is composed of an elastically deformable material.

7. The fan rotor of claim 6, wherein the conduit is positioned near one of either the first spacer end or the second spacer end.

8. The fan rotor of claim 7, wherein the conduit is composed of a metallic material.

9. The fan rotor of claim 7, wherein the conduit is formed in a helical shape.

10. The fan rotor of claim 7, wherein the elastically deformable material is selected from a group consisting of: a rigid elastic material, a compliant material, an elastomeric material, a viscoelastic composite material, a plastically crushable material, a thermoplastic material, a thermoset material, and a honeycomb structured material.

11. A gas turbine engine comprising: a fan assembly comprising:
    a disk including a plurality of slots in its periphery, each slot including a slot bottom surface;
    a plurality of blades attached to the disk, each blade including a blade root engaged in a corresponding one of the plurality of slots; and
    an elongated spacer interposed between each of the blade root and the slot bottom surface of the corresponding one of the plurality of slots, wherein the elongated spacer includes a first spacer end and a second spacer end;
    a conduit, including a conduit outer surface and a conduit inner surface, disposed within the elongated spacer, wherein the conduit includes a plurality of threads disposed on the conduit inner surface, wherein the conduit includes a plurality of threads disposed on the conduit outer surface; and
    wherein the elongated body member is composed of an elastically deformable material.

12. The gas turbine engine of claim 11, wherein the conduit is positioned near one of either the first spacer end or the second spacer end.

13. The gas turbine engine of claim 11, wherein the conduit is composed of a metallic material.

14. The gas turbine engine of claim 11, wherein the conduit is formed in a helical shape.

15. The gas turbine engine of claim 11, wherein the elastically deformable material is selected from a group consisting of: a rigid elastic material, a compliant material, an elastomeric material, a viscoelastic composite material, a plastically crushable material, a thermoplastic material, a thermoset material, and a honeycomb structured material.

* * * * *